UNITED STATES PATENT OFFICE.

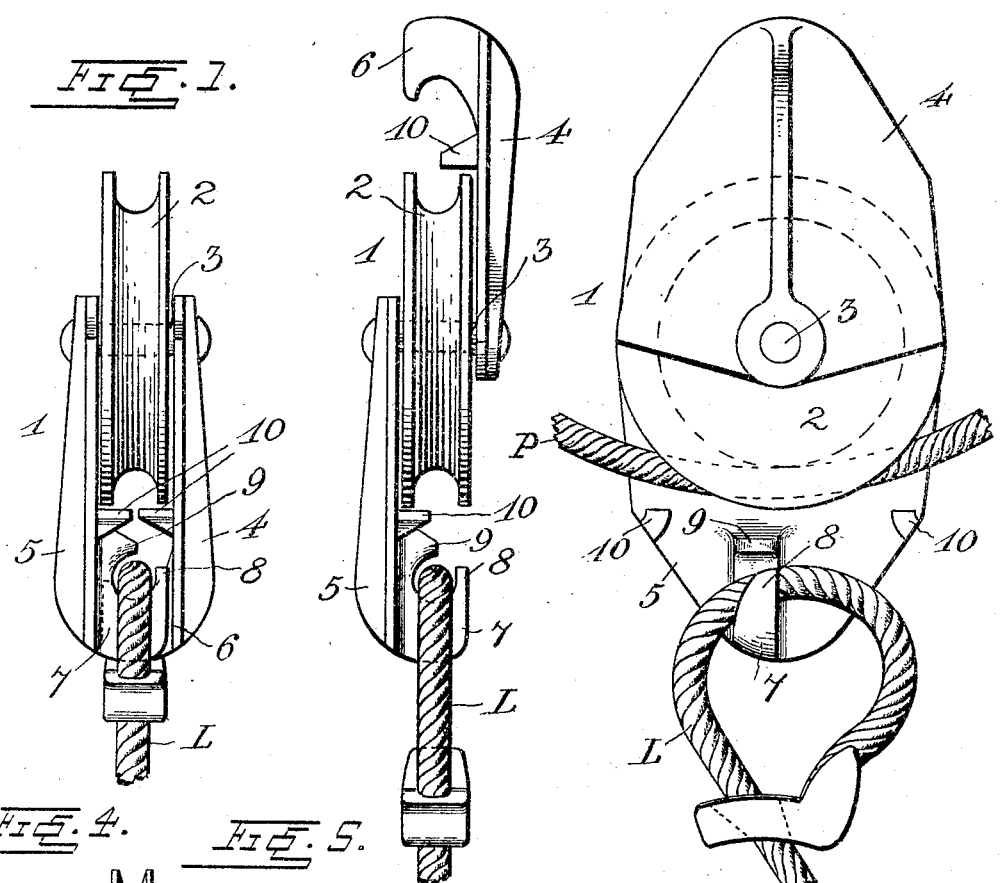
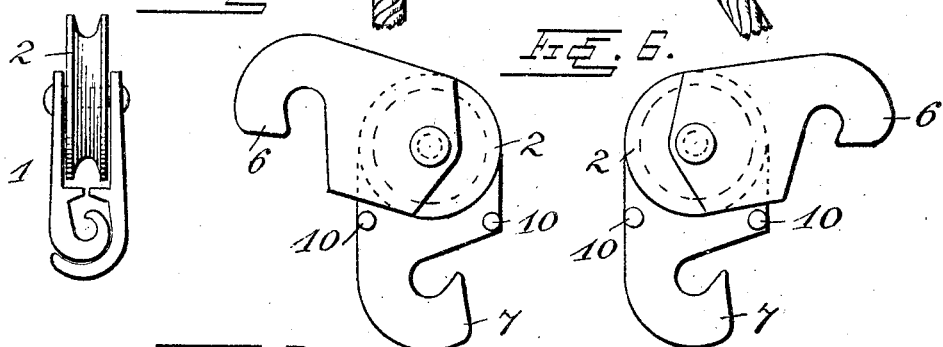
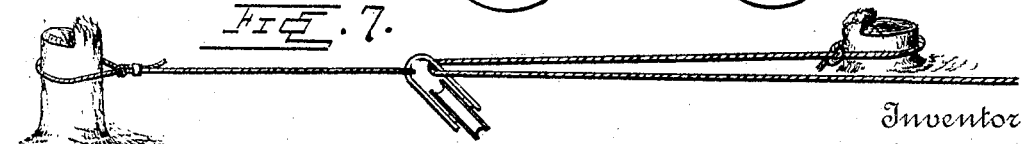

WILLIAM SMITH, OF LA CRESCENT, MINNESOTA.

SNATCH-BLOCK.

No. 796,366. Specification of Letters Patent. Patented Aug. 1, 1905.

Application filed March 2, 1905. Serial No. 248,171.

*To all whom it may concern:*

Be it known that I, WILLIAM SMITH, a citizen of the United States, residing at La Crescent, in the county of Houston and State of Minnesota, have invented certain new and useful Improvements in Snatch-Blocks; and I do declare the following to be a full, clear, and exact description of the invention, such as will enable others skilled in the art to which it appertains to make and use the same.

My invention relates to new and useful improvements in snatch-blocks.

The objects of the invention are to improve the construction of the shell or casing of the sheave, to furnish a means for holding the pull-rope on the sheave, and to provide an improved attachment of the snatch-block to the hitching-rope, so that the former cannot be lost off of the latter.

In the accompanying drawings, Figure 1 is an edge view of my improved snatch-block, the same being in its closed position and attached to the loop or link of a hitching-rope. Fig. 2 is a similar view of the same, the parts being in their open position. Fig. 3 is a side view of the snatch-block in its open position, shown in Fig. 2. Figs. 4, 5, and 6 are views of slightly-modified forms of my invention, and Fig. 7 is a detail view illustrating one of the defects in the form of snatch-blocks now in use.

Referring to the drawings by numerals, 1 denotes my improved snatch-block, which consists of a sheave 2, having a grooved periphery and mounted to revolve upon a metal pintle 3, which has pivoted upon its ends two independent casing members 4 and 5. The outward extremities of said members are formed into hooks 6 and 7, which together form a single hook adapted to receive the link or loop L of the hitching-rope. This link or loop L is preferably formed by means of the loop-block shown in my application for patent filed December 29, 1904, and bearing serial number 238,825. The hook portions or sections 6 and 7 upon the two members of the casing are adapted to be swung together to form a single hook, and they are so constructed that when the loop L is loosened they may be readily swung apart, as shown in Fig. 3, to permit the loop L to be applied to or removed from said hook and also to permit the pull-rope P to be applied to or removed from the sheave 2.

To prevent the loop L from being casually displaced from the hook portion 7, the latter is formed with a contracted neck or inlet opening by providing the projections 8 and 9, as clearly shown in Figs. 1 and 2. The space between these projecting portions of the hook 7 is slightly less than the diameter or thickness of the wire or link of which the loop L is formed, so that the said rope must be flattened at one point in order to permit it to be applied to or removed from the said hook. This, it will be seen, effectively prevents the loop from being casually disconnected from the hook. The hook portion 6 has its neck enlarged or open, as seen in Fig. 1, so that it may be readily swung away from the hook portion 7 when the loop or link L is sufficiently enlarged.

It is a common occurrence when using a snatch-block that whenever tension has been applied to the pull-rope the rope falls off of the sheave and before it is noticed it is cut in two by being pulled across the corners of the casing, as shown in Fig. 7. In order to overcome this difficulty, I provide upon the inner faces of the members 4 and 5 of the casing adjacent to each of their outer edges lugs or projections 10, which are adapted to aline with each other when the device is in its closed position to prevent the pull-rope from falling out of the groove in the periphery of the sheave 2.

I desire it to be understood that I do not limit my invention to the precise arrangement hereinbefore described and shown in Figs. 1, 2, and 3, since the hooks on the outside of the casing members may be made to point to the side of the sheave or the edge of the sheave either way, with the hooks alongside of each other, as shown in Figs. 5 and 6, or with one hook over the other, as shown in Fig. 4. In each of these forms of the invention one of the coacting hooks has a contracted neck to cause the hitching-rope to be retained therein, and the other hook has a free or open neck to permit it to be readily disengaged from the hitching-rope. The stops or projections 10 are provided in each of the forms of the invention shown in Figs. 4, 5, and 6 of the drawings.

Having thus described my invention, what I claim as new, and desire to secure by Letters Patent, is—

1. In a snatch-block, the combination with a sheave-pintle of two separate casing members, each casing member having an outward projection formed into a hook, the point of one hook being long and partly closed at the point to a size smaller than the rope so that the rope or loop cannot enter the hook until the rope is hammered thinner in one spot on the side of the loop, so that the loop will go in the hook and not lose out while in use.

2. In a snatch-block, the combination with a sheave-pintle, of two separate casing members pivoted thereon, each casing member having inward projections on the inside of the casing and near each outside edge, as that when the block is closed these projections on the inside of one casing member match with the projections on the other casing member between the casings to lock the pull-rope in the groove of the sheave while the block is in use, as shown, and for the purpose specified.

3. In a snatch-block, the combination with a sheave-pintle, of two casing members pivoted thereon and formed with coacting hooks, the hook of one of said members having a contracted neck or opening.

4. In a snatch-block, the combination with a sheave-pintle, of two casing members pivoted thereon, coacting hook portions on said members, adapted to swing together to form a single hook, the hook portion upon one of said members having a contracted neck or inlet opening to cause the link or loop to be retained therein, and the hook portion upon the other of said members having an open or free neck to permit it to be readily swung out of engagement with said loop or link.

5. In a snatch-block, the combination of a sheave, a pintle extending therethrough, two casing members pivoted upon the ends of said pintle, inwardly-extending projections upon the inner faces of said members to retain a rope or cable in the groove of said sheave, and coacting hooks upon each of said members adapted to swing together to form a single hook, the hook upon one of said members being formed with a contracted neck portion to cause a loop or link to be retained in said hook.

In testimony whereof I have hereunto set my hand in presence of two subscribing witnesses.

WILLIAM SMITH.

Witnesses:
   MARK W. SMITH,
   WILMOT MOWATT.